(12) United States Patent
Maynard (10) Patent No.: US 9,903,686 B2
(45) Date of Patent: Feb. 27, 2018

(54) FORWARD FRAMING GUNSIGHT (71) Applicant: John Maynard, Wilmington, NC (US)

(72) Inventor: John Maynard, Wilmington, NC (US)

(*) Notice: Subject to any disclaimer, the term of this patent is extended or adjusted under 35 U.S.C. 154(b) by 0 days.

(21) Appl. No.: 14/924,695

(22) Filed: Oct. 27, 2015

(65) Prior Publication Data
US 2016/0146575 A1 May 26, 2016

Related U.S. Application Data (60) Provisional application No. 62/069,267, filed on Oct. 27, 2014.

(51) Int. Cl.
F41G 1/00 (2006.01)
F41G 1/02 (2006.01)
G09G 5/00 (2006.01)
H02J 7/00 (2006.01)
G06F 3/147 (2006.01)

(52) U.S. Cl.
CPC .............. F41G 1/02 (2013.01); G06F 3/147 (2013.01); G09G 5/003 (2013.01); H02J 7/0052 (2013.01); G09G 2380/06 (2013.01)

(58) Field of Classification Search
CPC . F41G 1/02; F41G 1/027; F41G 1/033; F41G 1/04; F41G 1/42; F41G 1/425
USPC .......................................................... 42/141
See application file for complete search history.

(56) References Cited

U.S. PATENT DOCUMENTS

| 968,115 | A | * | 8/1910 | Bishop | F41G 1/02 42/144 |
| 1,205,756 | A | * | 11/1916 | Baron | F41G 1/473 42/141 |
| 1,964,027 | A | * | 6/1934 | Bliss | F41G 1/46 42/141 |
| 2,028,055 | A | * | 1/1936 | Forsling | F41G 1/04 42/130 |
| 2,367,762 | A | * | 1/1945 | Eiane | F41G 1/033 42/148 |
| 2,519,220 | A | * | 8/1950 | Bentley | F41G 1/473 42/141 |
| 2,628,426 | A | * | 2/1953 | West | F41G 1/02 42/144 |
| 2,839,832 | A | * | 6/1958 | Williams | F41G 1/02 42/111 |
| 2,855,680 | A | * | 10/1958 | Christensen | F41G 1/02 42/144 |
| 2,904,888 | A | * | 9/1959 | Niesp | F41G 1/473 42/141 |
| 4,223,446 | A | * | 9/1980 | Villa | F41G 1/473 42/141 |
| 5,671,561 | A | * | 9/1997 | Johnson | F41G 1/35 42/114 |
| 2002/0073597 | A1 | * | 6/2002 | LoRocco | F41G 1/16 42/111 |
| 2004/0211105 | A1 | * | 10/2004 | Arachequesne | F41G 1/02 42/113 |

(Continued)

Primary Examiner — Gabriel Klein (57) ABSTRACT

An apparatus includes a first gunsight and a second gunsight, where both the first and the second sights are configured to be positioned on a forward portion of a barrel of a firearm. According to an embodiment, a third gunsight may be configured to be positioned on the forward portion of the barrel. The gunsight may be interchangeable with different gunsights.

20 Claims, 13 Drawing Sheets (56) References Cited

U.S. PATENT DOCUMENTS

2009/0013581 A1* 1/2009 LoRocco .............. F41G 1/345
 42/132

* cited by examiner

FORWARD FRAMING GUNSIGHT

I. CLAIM OF PRIORITY

This application a continuation patent application of and claims prior from, U.S. Provisional Patent Application Ser. No. 62/069,267, filed on Oct. 27, 2014, which is incorporated by reference herein in its entirety for all purposes.

II. FIELD OF THE DISCLOSURE

The disclosure relates to firearms, and more particularly, to gunsights as may be present on pistols, rifles, toy guns, shotguns, and other real and mock firearms.

III. BACKGROUND

When discharging a firearm, a shooter initially focuses the single post on the forward (e.g., far/front) portion of the barrel. The shooter then focuses on the rear (e.g., near/back/handle-side) gunsight, and then focuses on the target. This aiming process can cost a shooter crucial moments of delay while competing, defending, or hunting.

IV. SUMMARY OF THE DISCLOSURE

According to an embodiment, an apparatus includes a first gunsight and a second gunsight, where both the first and the second sights are configured to be positioned on a forward portion of a barrel of a firearm. According to an embodiment, a third gunsight may be configured to be positioned on the forward portion of the barrel.

The first gunsight may include an elongated along an axis parallel to a length of the barrel. The first gunsight may include a post. The first gunsight may include a translucent, or a semi-opaque material. The translucent material may include a fiber optic material or a tritium material. The translucent material may be tinted.

An axis of the first gunsight may be aligned in a parallel orientation relative to an axis of the second gunsight. According to another embodiment, an axis of the first gunsight may be angled relative to an axis of the second gunsight. A length of the first gunsight may be staggered with respect to a length of the second gunsight. According to another embodiment, a length of the first gunsight is aligned with respect to a length of the second gunsight. A length of the first gunsight may extend substantially along a length of the barrel.

A width of the first gunsight may be wider than a width of the second gunsight. A height of the first gunsight may be the same as a height of the second gunsight. A height of the first gunsight may be higher than a height of the second gunsight.

The apparatus may include a base onto which at least one of the first and second gunsights are mounted, where the base is attachable to the barrel. At least one of the first gunsight and a base section attached to the first gunsight slides into a groove proximate barrel. The apparatus may further include a cover portion that attaches to the barrel and to at least one of the first gunsight and a base section attached to the first gunsight. The first gunsight may be positioned on a different side of the barrel than a rear sight.

According to another embodiment, an apparatus includes a first gunsight that may be replaced with another interchangeable gunsight. The apparatus may thither include an attachment mechanism configured to secure the interchangeable gunsight to a firearm, wherein the interchangeable gunsight is one of a plurality of interchangeable gunsights configured to be attached to the firearm using the attachment mechanism or a second attachment mechanism.

Advantages and features that characterize embodiments are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments.

V. DETAILED DESCRIPTION

An embodiment of a gunsight system may make it easier to focus on targets downrange using both eyes. Conventional sights cause shooters to often shoot with one eye closed. The gunsight system of an embodiment may allow a shooter to see the target while maintaining situational awareness and depth perception. A user may draw their weapon and acquire their target faster.

The sighting system may maintain greater accuracy. When aiming down the sight, for instance, at 20 ft, accuracy may stay within a 4.5 inch spread no matter which framing post is used. The sights may be lightweight and machined from polymer or steel or plastic or wood or metal, or porcelain or virtually any material. The gunsights may include two channels separated by three fiver or tritium sigh pieces. By machining a rail system compatible with popular gun companies, designs may be used on handguns, shotguns, or rifles, among other firearms.

Portions of the gunsights may be connected to one another. In this sense, it sight of an embodiment may include a structure extending perpendicular to a surface of a barrel.

Sights may be positioned at any orientation (i.e., 360 degrees) around the barrel. Such an orientation may be advantageous when a shooter turns a rifle or other firearm sideways. Certain embodiments may include multiple sets of framing sights around a barrel of a gun to allow a shooter to selectively use them. For example, a first framing sight set (comprising multiple gunsights) may be oriented on an opposite side of a barrel relative to a second framing sight.

Figure 1:
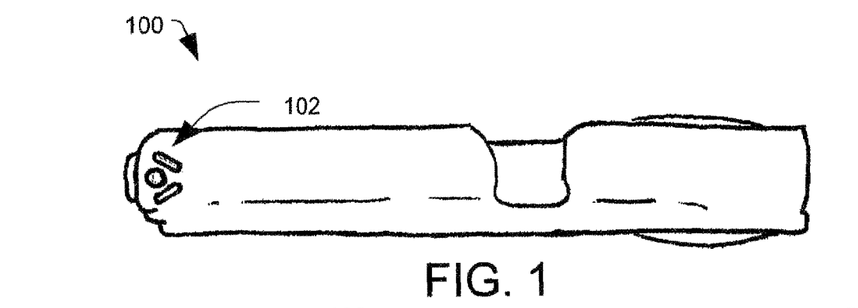

FIG. 1 is a top view of a firearm sighting system 100 a includes forward gunsights 102.

Figure 2:
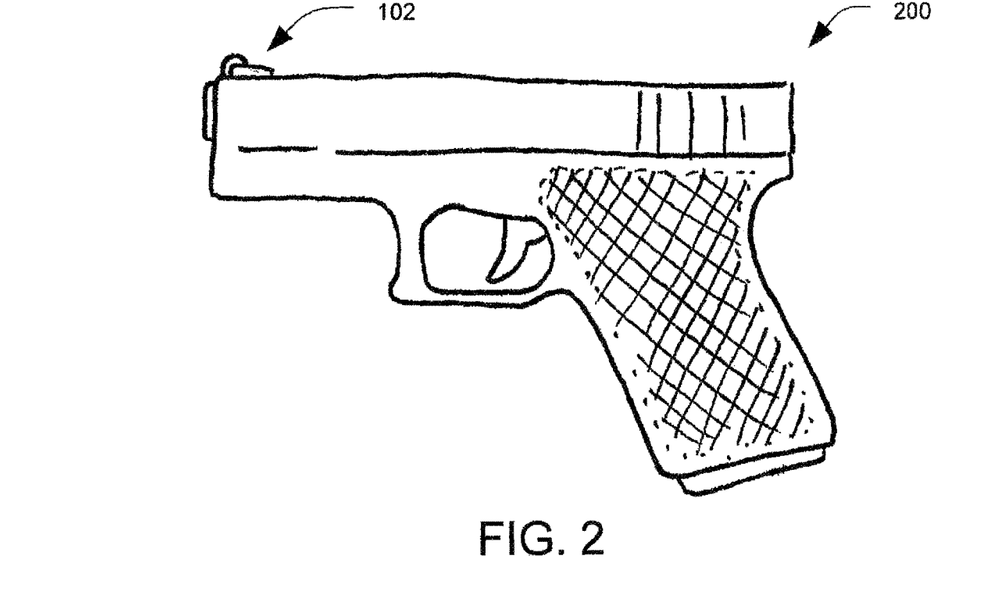

FIG. 2 is a side view of a firearm sighting system 200 that includes forward gunsights similar or identical to gunsights 102 of FIG. 1.

Figure 3:
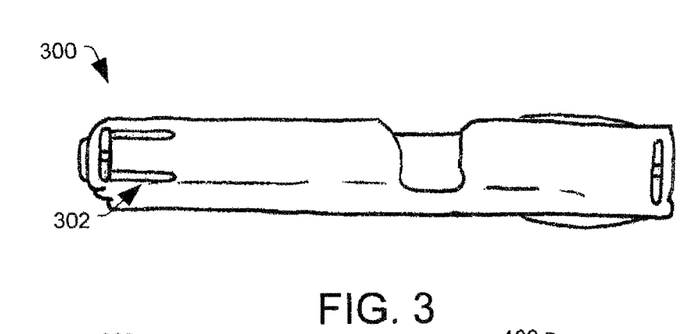

FIG. 3 is a top view of a firearm sighting system 300 that includes forward gunsights 302.

Figure 4:
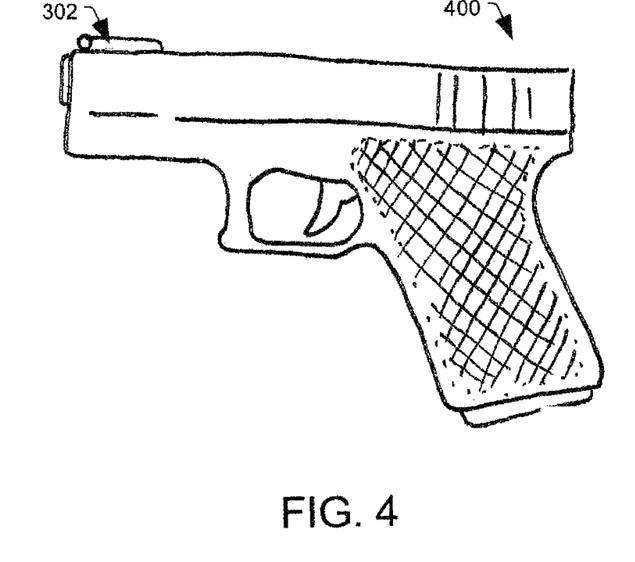

FIG. 4 is a side view of a firearm sighting system 400 that includes forward gunsights similar or identical to gunsights 302 of FIG. 3.

Figure 5:
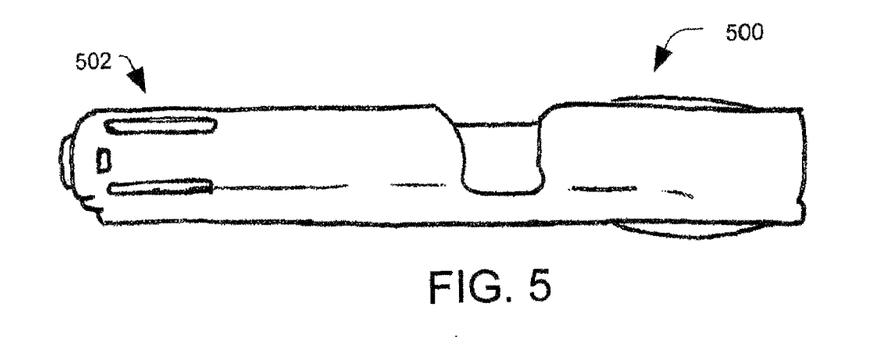

FIG. 5 is a top view of a firearm sighting system 500 that includes forward gunsights 502.

Figure 6:
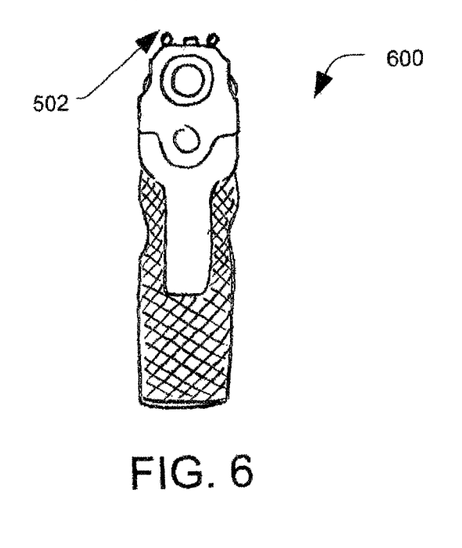

FIG. 6 is a side view of a firearm sighting system 600 that includes forward gunsights similar or identical to gunsights 502 of FIG. 5.

Figure 7:
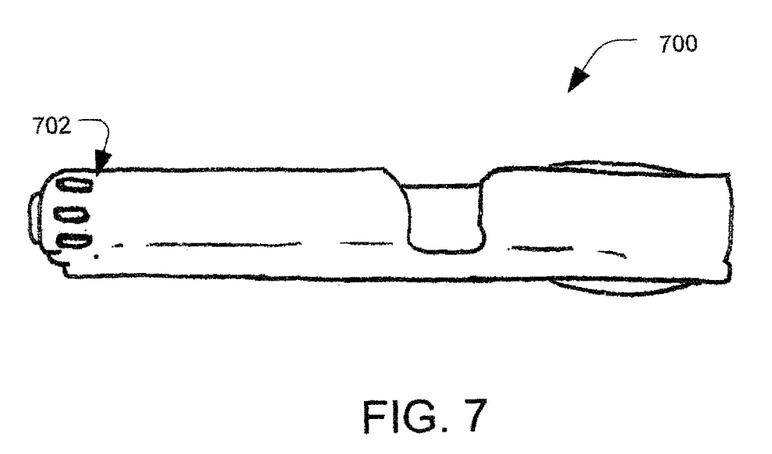

FIG. 7 is a top view of a firearm sighting system 700 that includes forward gunsights 702.

Figure 8:
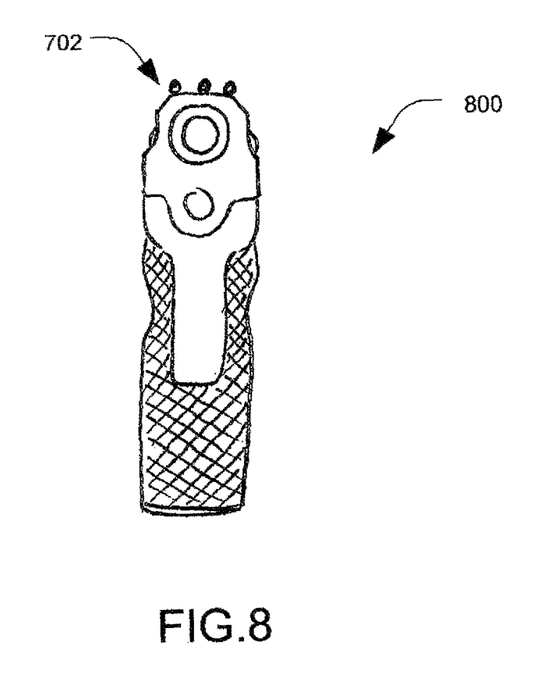

FIG. 8 is a front view of a firearm sighting system 800 that includes forward gunsights similar or identical to gunsights 702 of FIG. 7.

Figure 9:
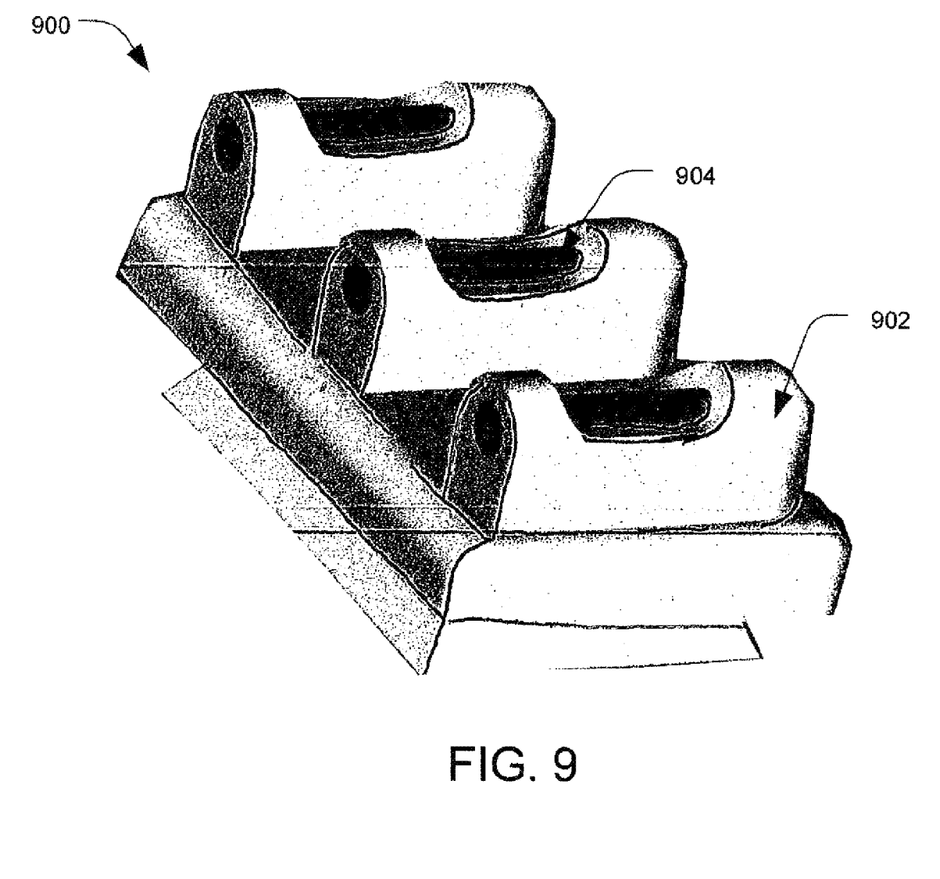

FIG. 9 shows a perspective view of gunsight 900 that include a sight 902 with a hollow portion into which a translucent portion 904 is positioned to catch light.

Figure 10:
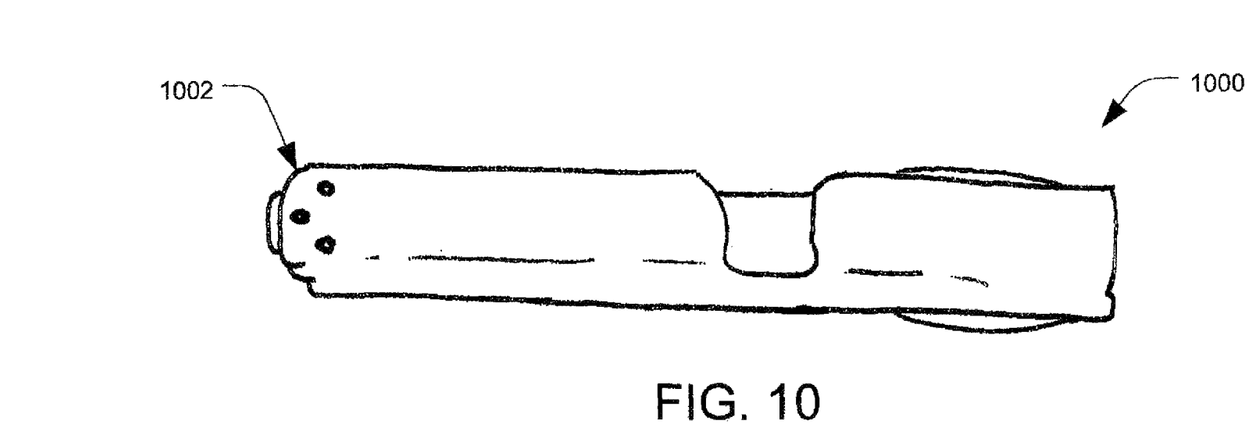

FIG. 10 is a top view of a firearm sighting system 1000 that includes forward gunsights 1002.

Figure 11:
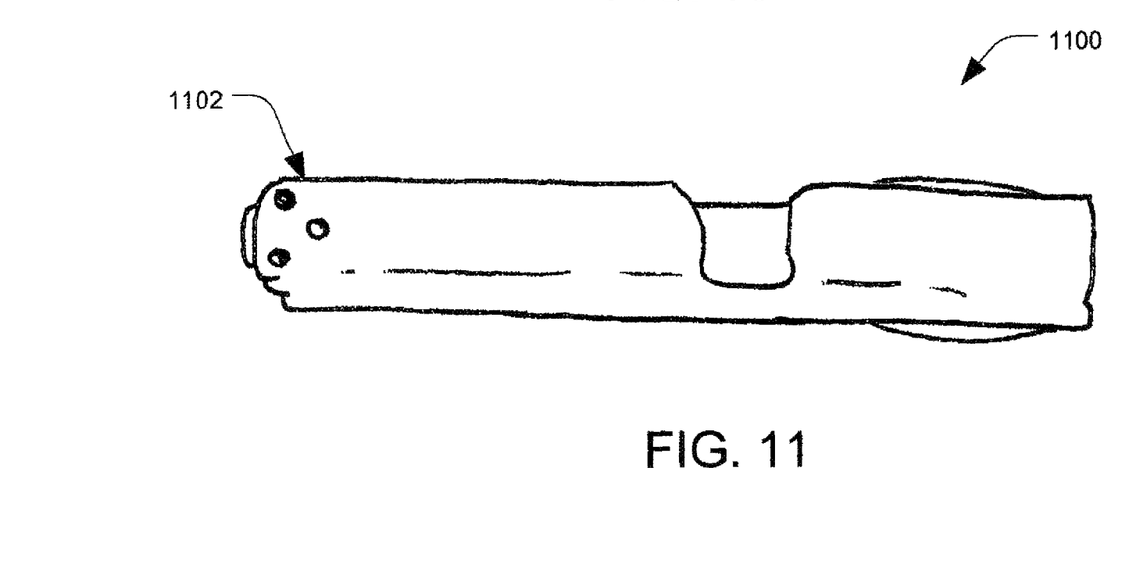

FIG. 11 is a top view of a firearm sighting system 1100 that includes forward gunsights 1102.

Figures 12, 13:
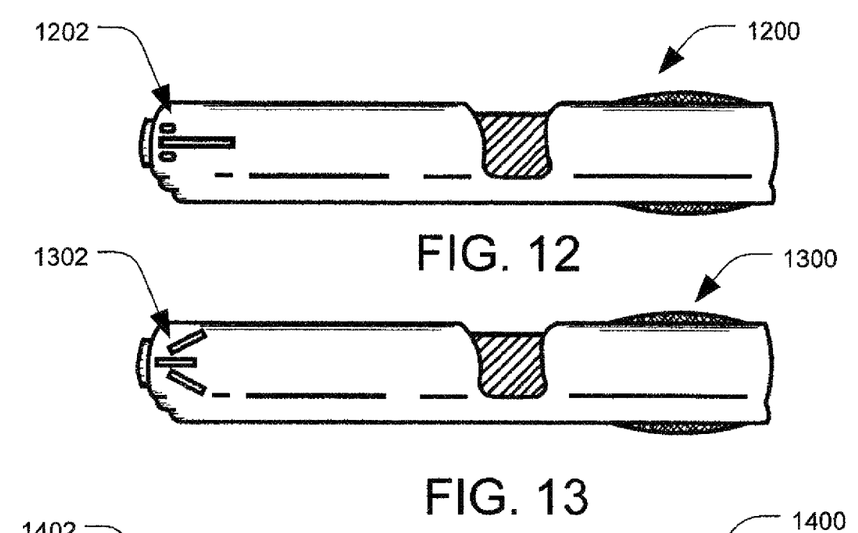

FIG. 12 is a top view of a firearm sighting system 1200 that includes forward gunsights 1202.

FIG. 13 is a top view of a firearm sighting system 1300 that includes forward gunsights 1302.

Figure 14:
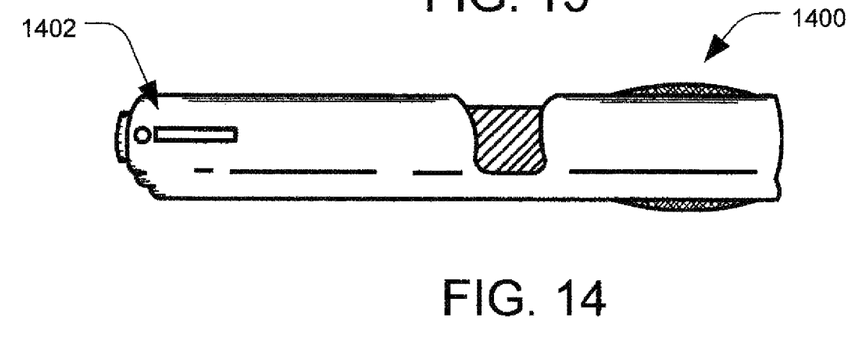

FIG. 14 is a top view of a firearm sighting system 1400 that includes forward gunsights 1402.

Figure 15:
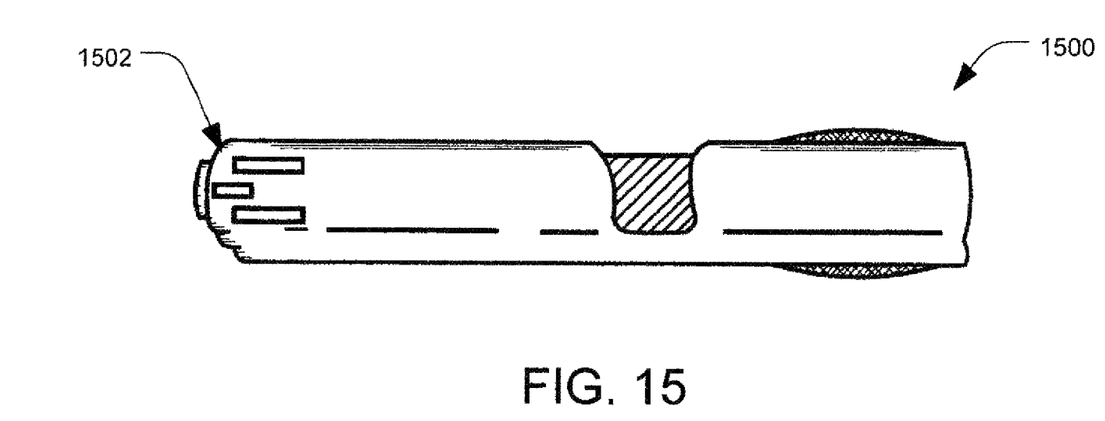

FIG. 15 is a top view of a firearm sighting system 1500 that includes forward gunsights 1502.

Figure 16:
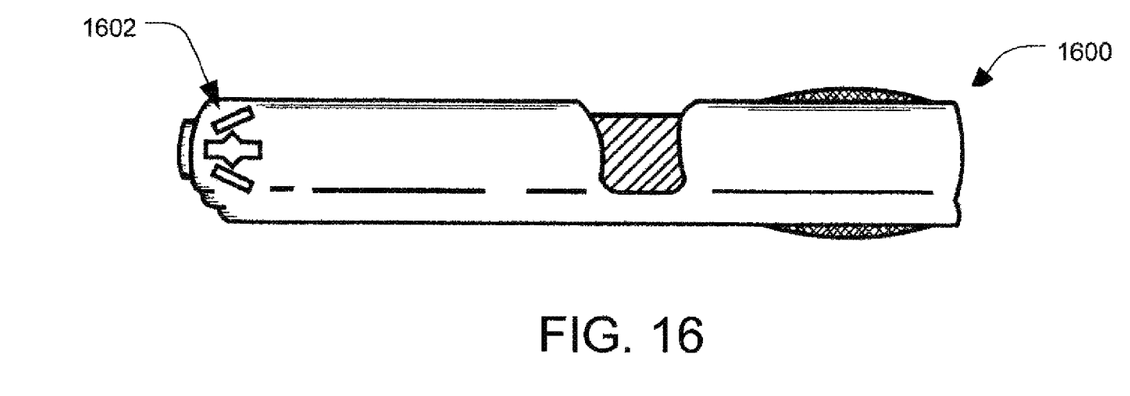

FIG. 16 is a top view of a firearm sighting system 1600 that includes forward gunsights 1602.

Figure 17:
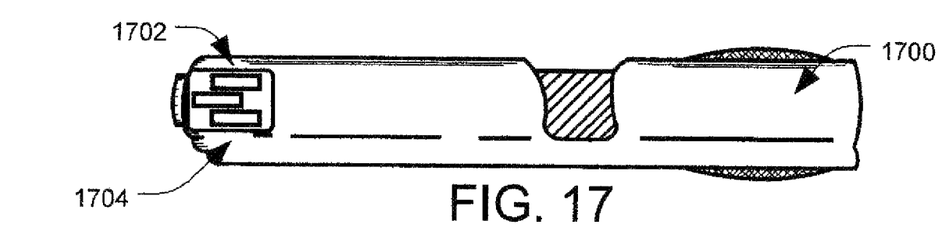

FIG. 17 is a to view of a firearm sighting system 1700 that includes forward gunsights 1702. The sights 1702 may be mounted on a platform or base 1704 that is attached to the firearm. For instance, a sleeve or adhesive or mechanical fastener may attach the sights 1702 such that they may be interchangeably exchanged far another set of sights.

Figure 18:
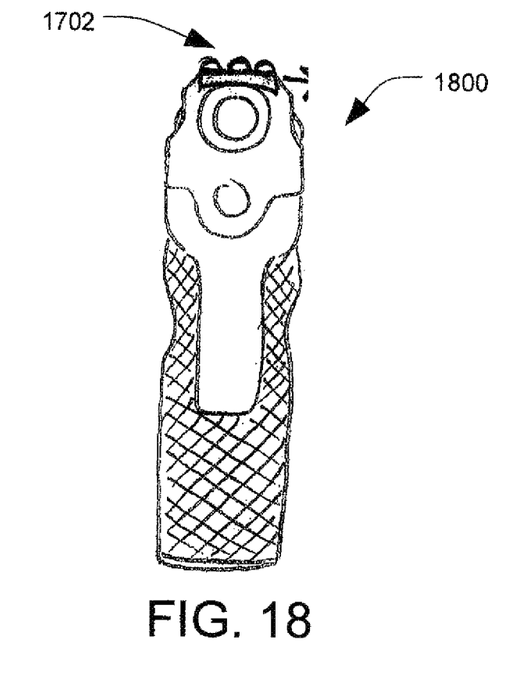

FIG. 18 is a front view of a firearm sighting system 1800 that includes forward gunsights similar or identical to gunsights 1702 of FIG. 17.

Figure 19:
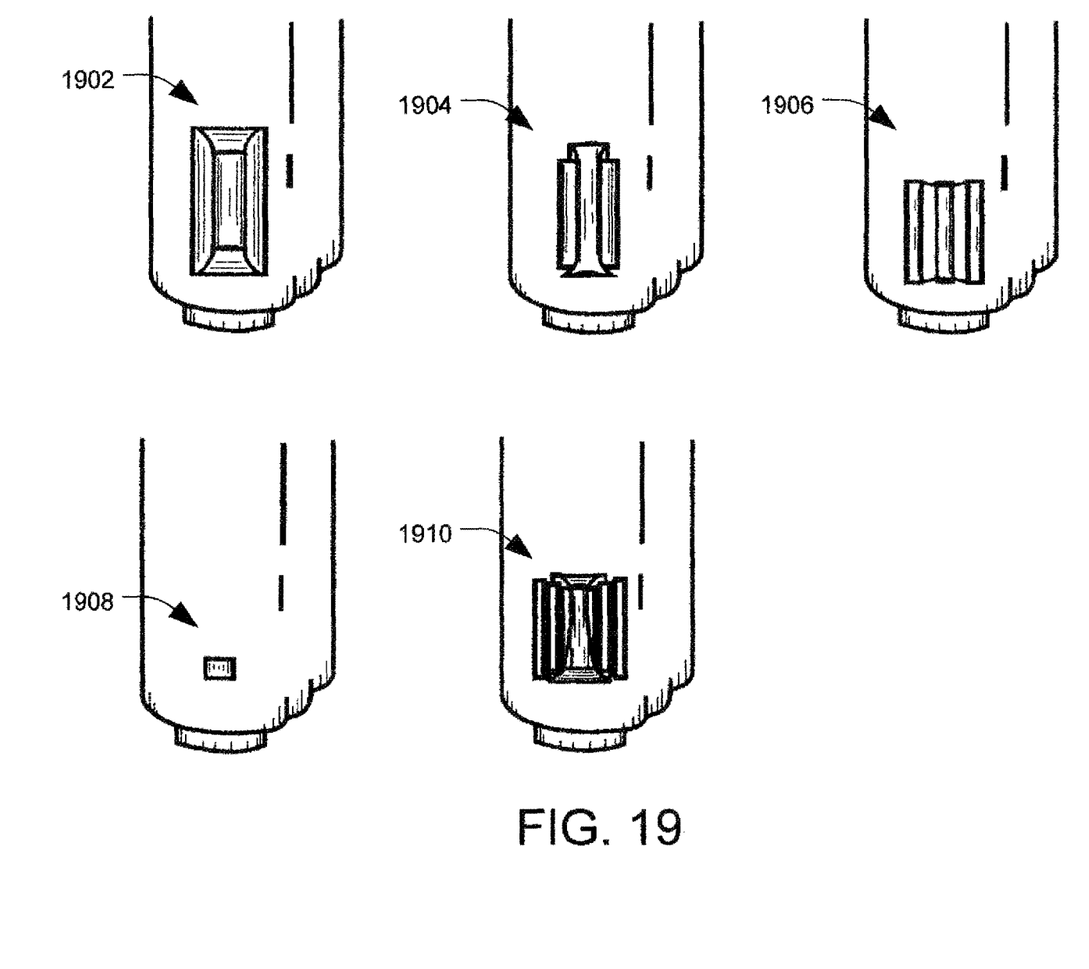

FIG. 19 shows different embodiments of gunsights 1902, 1904, 1906, 1908, 1910 that may be interchangeably or permanently mounted onto a forward portion of a firearm. The gunsights 1902 1904, 1906, 1908, 1910 may include translucent portions.

Figure 20:
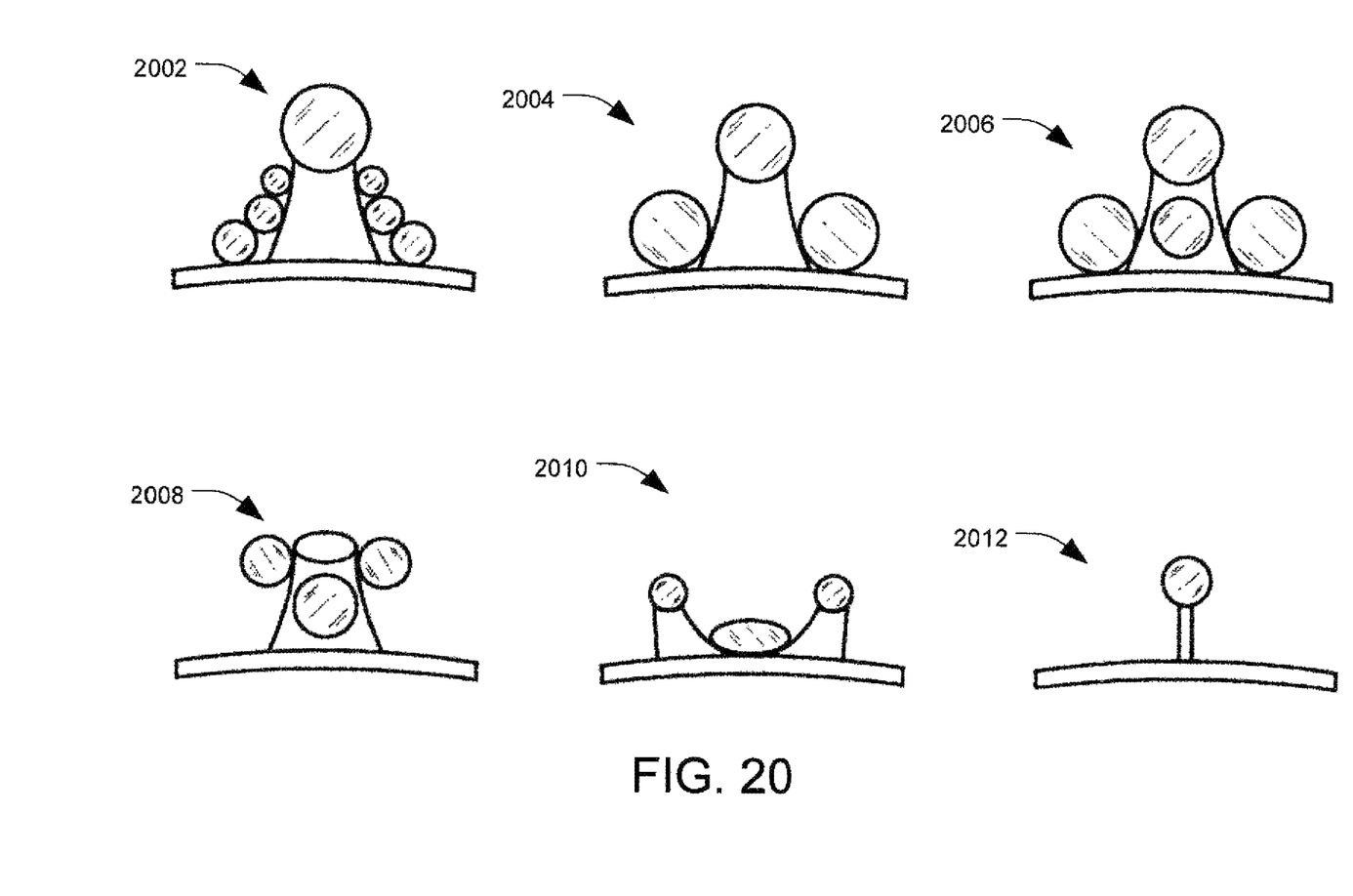
Figure 21:
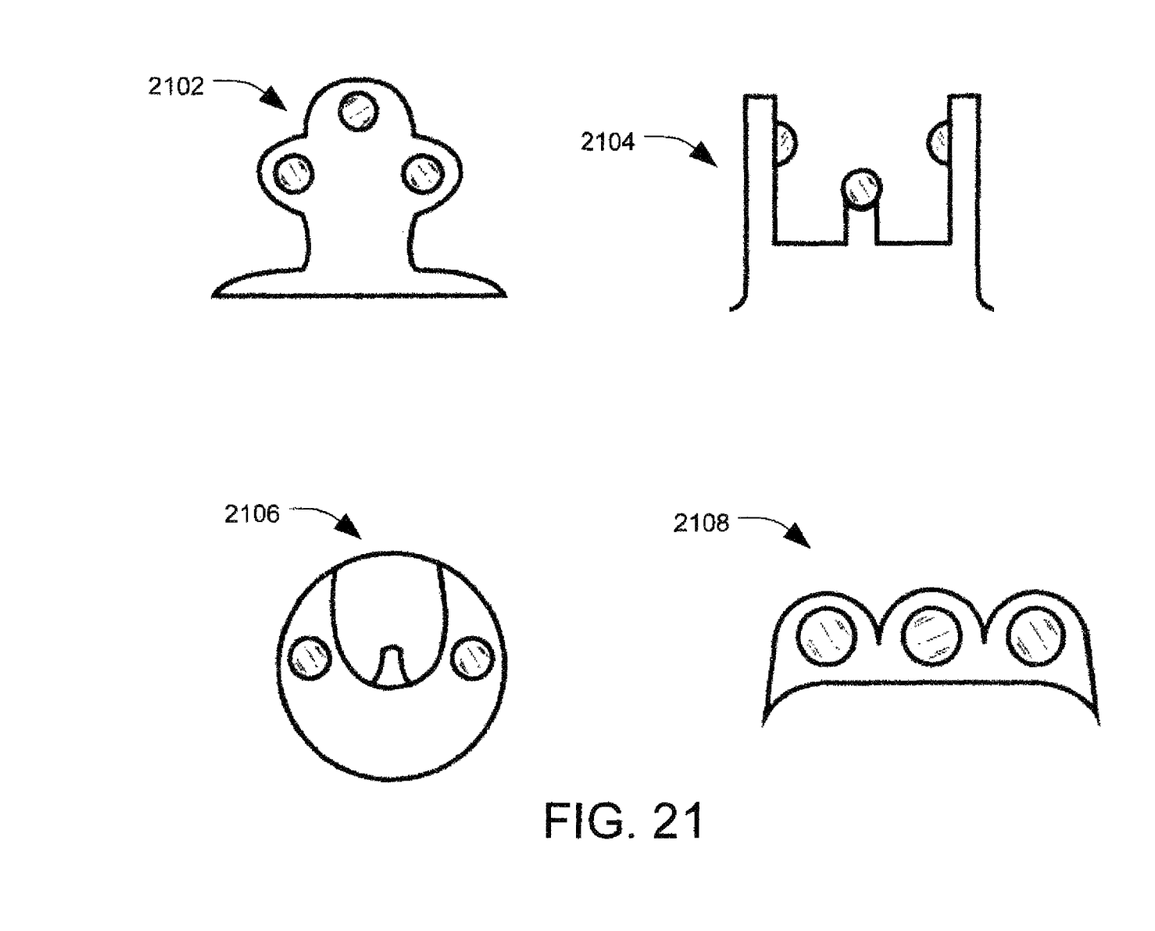

FIGS. 20 and 21 show embodiments of gunsights 2002, 2004, 2006, 2008, 2010, 2012, 2102, 2104, 2106, 2108 that may be interchangeably or permanently mounted onto a forward Portion of a firearm. The gunsights may include translucent and/or hollow/see-through portions.

Figure 22:
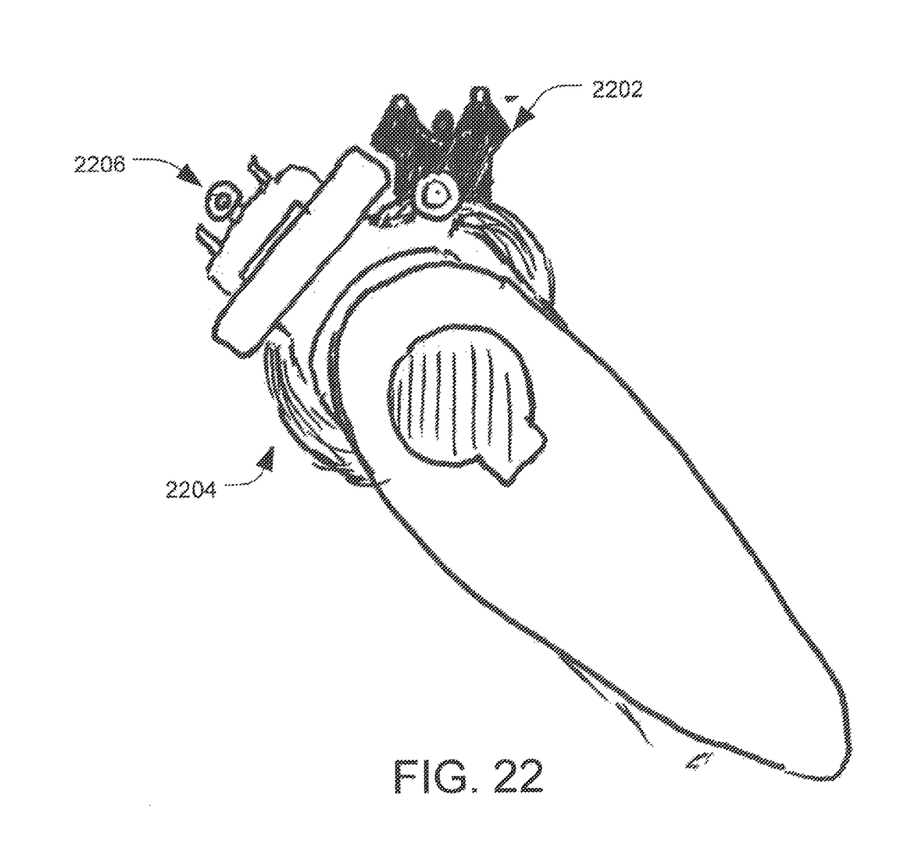

FIG. 22 shows a first forward framing gunsight 2202 that is positioned on a different side of a barrel 2204 than a rear sight 2206.

Those skilled in the art may make numerous uses and modifications of and departures from the specific apparatus and techniques disclosed herein without departing from the inventive concepts. Consequently, the disclosed embodiments should be construed as embracing each and every novel feature and novel combination of features present in or possessed by the apparatus and techniques disclosed herein and limited only by the scope of the appended claims, and equivalents thereof.

The invention claimed is:

1. An apparatus comprising:
    a firearm slide having a top surface extending from a muzzle end to a rear end, a longitudinal centerline of said top surface defining a longest dimension of said top surface;
    a first gunsight comprising a post mounted on said top surface to the left of said centerline and at a first distance from the muzzle end;
    a second gunsight comprising a post mounted on said top surface to the right of said centerline and at said first distance from the muzzle end;
    a third gunsight comprising a post mounted on said top surface upon said center line and oriented parallel thereto and at a second distance from the muzzle end;
    wherein said second distance is either greater than or less than said first distance;
    wherein the first, second, and third gunsights are all mounted upon the top surface at a location closer to the muzzle end than to a point equidistant to the muzzle end and to the rear end;
    wherein the first, second, and third gunsights each include a translucent material; and
    wherein the first and second gunsights are configured to frame a target without narrowing a shooter's field of vision.

2. The apparatus of claim 1, wherein the first and second gunsights each comprise a framing sight that is interchangeable with another framing sight.

3. The apparatus of claim 1, wherein the translucent material includes a fiber optic material or a tritium material.

4. The apparatus of claim 1, wherein the translucent material is tinted.

5. The apparatus of claim 1, wherein an axis of the first gunsight is alienated in a parallel orientation relative to an axis of the second gunsight.

6. The apparatus of claim 1, wherein an axis of the first gunsight is angled relative to an axis of the second gunsight.

7. The apparatus of claim 1, wherein a length of the first gunsight is aligned with respect to a length of the second gunsight.

8. The apparatus of claim 1, wherein a width of the first gunsight is wider than a width of the second gunsight.

9. The apparatus of claim 1, wherein a height of the first gunsight is the same as a height of the second gunsight.

10. The apparatus of claim 1, wherein a height of the first gunsight is higher than a height of the second gunsight.

11. The apparatus of claim 1, further comprising a base onto which at least one of the first and second gunsights are mounted, wherein the base is attachable to the slide.

12. The apparatus of claim 1, wherein at least one of the first gunsight and a base section attached to the first gunsight into a groove proximate the slide.

13. The apparatus of claim 1, further comprising a cover portion that attaches to the slide and to at least one of the first gunsight and a base section attached to the first gunsight.

14. The apparatus of claim 1, wherein without narrowing a shooter's field of vision includes without narrowing a peripheral vision of the shooter.

15. An apparatus comprising:
    a firearm barrel having a top surface extending from a muzzle end to a rear end, a longitudinal centerline of said top surface defining a longest dimension of said top surface;
    a first gunsight comprising a post mounted on said top surface to the left of said centerline and at a first distance from the muzzle end;
    a second gunsight comprising a post mounted on said top surface to the right of said centerline and at said first distance from the muzzle end;
    a third gunsight comprising a post mounted on said top surface upon said center line and oriented parallel thereto and at a second distance from the muzzle end;
    wherein said second distance is either greater than or less than said first distance;
    wherein the first, second, and third gunsights are all mounted upon the top surface at a location closer to the muzzle end than to a point equidistant to the muzzle end and to the rear end;
    wherein the first, second, and third gunsights each include a translucent material; and
    wherein the first and second gunsights are configured to frame a target without narrowing a shooter's field of vision.

16. The apparatus of claim 15, wherein the first and second gunsights each comprise a framing sight that is interchangeable with another framing sight.

17. The apparatus of claim 15, wherein the translucent material includes a fiber optic material.

18. The apparatus of claim 15, wherein the translucent material is tinted.

19. The apparatus of claim 15, wherein an axis of the first gunsight is aligned in a parallel orientation relative to an axis of the second gunsight.

20. The apparatus of claim 15, wherein an axis of the first gunsight is angled relative to an axis of the second gunsight.

* * * * *